United States Patent
Lee et al.

(10) Patent No.: US 7,537,851 B2
(45) Date of Patent: May 26, 2009

(54) FUEL CELL SYSTEM INCLUDING SEPARATOR HAVING COOLING WATER FLOW CHANNELS

(75) Inventors: Dong-Hun Lee, Suwon-si (KR); Ho-Jin Kweon, Suwon-si (KR); Ju-Yong Kim, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 855 days.

(21) Appl. No.: 11/044,220

(22) Filed: Jan. 28, 2005

(65) Prior Publication Data
US 2005/0202295 A1 Sep. 15, 2005

(30) Foreign Application Priority Data
Jan. 30, 2004 (KR) .................. 10-2004-0006000

(51) Int. Cl.
H01M 8/00 (2006.01)
H01M 8/02 (2006.01)
H01M 8/04 (2006.01)
H01M 8/06 (2006.01)
H01M 8/10 (2006.01)

(52) U.S. Cl. .................. 429/26; 429/12; 429/20; 429/30; 429/34; 429/38; 429/39

(58) Field of Classification Search .............. None
See application file for complete search history.

(56) References Cited

U.S. PATENT DOCUMENTS

| 4,692,391 | A | | 9/1987 | Hirota |
| 5,858,567 | A | * | 1/1999 | Spear et al. .............. 429/12 |
| 5,945,232 | A | * | 8/1999 | Ernst et al. .............. 429/32 |
| 6,232,006 | B1 | * | 5/2001 | Breault .............. 429/26 |
| 6,461,754 | B1 | * | 10/2002 | Zeng .............. 429/26 |
| 2001/0028968 | A1 | * | 10/2001 | Griesmeier .............. 429/19 |
| 2002/0107140 | A1 | * | 8/2002 | Hampden-Smith et al. .. 502/185 |
| 2002/0182455 | A1 | * | 12/2002 | Rush, Jr. .............. 429/13 |

(Continued)

FOREIGN PATENT DOCUMENTS

EP 1180656 * 2/2002

(Continued)

OTHER PUBLICATIONS

EPO machine translation retrieved on Jul. 30, 2008 of EP 1180656 published on Feb. 20, 2002.*

(Continued)

*Primary Examiner*—Dah-Wei D Yuan
*Assistant Examiner*—Katherine Turner
(74) *Attorney, Agent, or Firm*—H.C. Park & Associates, PLC

(57) ABSTRACT

The present invention is a fuel cell system including a stack having an electricity generator, that includes separators disposed on both surfaces of a membrane-electrode assembly, a reformer that converts fuel to generate hydrogen gas and supplies the hydrogen gas to the stack, a fuel supply unit that supplies the fuel to the reformer, an air supply unit that supplies air to the stack, a cooling water supply unit that supplies cooling water to the stack, and a flow channel section that is formed in the separator and through that the cooling water supplied from the cooling water supply unit passes.

25 Claims, 7 Drawing Sheets

U.S. PATENT DOCUMENTS

| | | | |
|---|---|---|---|
| 2003/0039874 A1* | 2/2003 | Jankowski et al. | 429/26 |
| 2003/0129470 A1* | 7/2003 | Tajima et al. | 429/34 |
| 2005/0266296 A1* | 12/2005 | An et al. | 429/38 |
| 2006/0172163 A1* | 8/2006 | Suh et al. | 429/26 |

FOREIGN PATENT DOCUMENTS

| | | |
|---|---|---|
| JP | 03102774 | 4/1991 |
| JP | 05283091 | 10/1993 |
| JP | 09063618 | 3/1997 |
| JP | 2001-143720 | 5/2001 |
| JP | 2001313053 | 11/2001 |
| JP | 2002025591 | 1/2002 |
| JP | 2002042841 | 2/2002 |

OTHER PUBLICATIONS

Benders' Dictionary of Nutrition and Food Technology, 2006, [online], [retrieved on Aug. 4, 2008], Retrieved from Credoreference using Internet <URL: http://www.credoreference.com/entry/6381884>.*

Academic Press Dictionary of Science and Technology, 1992, [online], [retrieved on Aug. 4, 2008], Retrieved from Credoreference using Internet <URL: http://www.credoreference.com/entry/3146894>.*

* cited by examiner

FUEL CELL SYSTEM INCLUDING SEPARATOR HAVING COOLING WATER FLOW CHANNELS

CROSS REFERENCE TO RELATED APPLICATION

This application claims priority to and the benefit of Korean Patent Application No. 10-2004-0006000, filed on Jan. 30, 2004, which is hereby incorporated by reference for all purposes as if fully set forth herein.

BACKGROUND OF THE INVENTION (a) Field of the Invention

The present invention relates to a fuel cell system, and more particularly, to a stack of a fuel cell system and a cooling structure of the stack.

(b) Description of the Related Art

In general, a fuel cell is an electricity generating system that converts chemical energy into electric energy through a chemical reaction between oxygen contained in air and hydrogen contained in hydrocarbon-containing materials such as methanol, ethanol, and natural gas. Certain fuel cells also generate heat as a byproduct of the chemical reaction, which can be simultaneously used with the electrical energy.

Such fuel cells are classified into categories including a phosphate fuel cell working at a temperature of about 150° C. to 200° C., a molten carbonate fuel cell working at a high temperature of about 600° C. to 700° C., a solid oxide fuel cell working at a high temperature of 1,000° C. or more, and a polymer electrolyte membrane fuel cell and an alkali fuel cell working at a room temperature or at a temperature of 100° C. or less, depending upon kinds of used electrolyte. All of the fuel cells work on basically the same principle, but are different from one another in type of fuel, operating temperature, catalyst, and electrolyte.

The recently developed polymer electrolyte membrane fuel cell (PEMFC) has an excellent output characteristic, a lower operating temperature, and fast starting and response characteristics compared with other fuel cells. It uses hydrogen obtained by reforming methanol, ethanol, natural gas, etc. as fuel. Accordingly, the PEMFC has a wide range of applications such as a mobile power source for vehicles, a distributed power source for homes or buildings, and a small-sized power source for electronic apparatuses.

The aforementioned polymer electrolyte membrane fuel cell requires a fuel cell main body called a stack, a fuel tank, and a fuel pump that supplies fuel to the stack from the fuel tank. The polymer electrolyte membrane fuel cell further comprises a reformer that converts the fuel from the fuel tank to generate hydrogen gas and then supplies the hydrogen gas to the stack. The fuel stored in the fuel tank is supplied to the reformer by means of the fuel pump. Then, the reformer converts the fuel and generates the hydrogen gas. The hydrogen gas and oxygen with each other in the stack, thereby generating electric energy.

Alternatively, such a fuel cell may employ a direct methanol fuel cell (DMFC) scheme which directly supplies liquid-state methanol fuel to the stack. The DMFC fuel cell does not require the reformer, unlike the polymer electrolyte membrane fuel cell.

In the fuel cell system described above, the stack has a tower structure of several or several tens of electricity generators, each generator having a membrane-electrode assembly (MEA) and separators (or bipolar plates). The membrane-electrode assembly includes an anode (also referred to as "fuel electrode" or "oxidation electrode") and a cathode (also referred to as "air electrode" or "reduction electrode") that are attached to each other with an electrolyte membrane interposed therebetween. The separator simultaneously functions as a passageway through which oxygen and hydrogen gas required for the reaction of the fuel cell are supplied and as a conductor connecting the anode and the cathode of each membrane-electrode assembly in series. Fuel gas containing hydrogen is supplied to the anode and oxygen gas containing oxygen is supplied to the cathode through the separator. Through this interaction, an oxidation reaction of the fuel gas takes place in the anode and a reduction reaction of the oxygen gas takes place in the cathode. The movement of electrons generated by the reactions also results in heat and water byproducts.

The stack should be maintained at a suitable temperature in such a fuel cell system in order to stabilize the electrolyte membrane and to prevent deterioration in performance. To moderate the temperature of the stack, a conventional fuel cell system employs a typical air cooling system in which the heat generated from the stack during operation is cooled by air having a relatively low temperature, or a water cooling system in which cooling water is supplied to the stack to cool the heat generated from the stack.

The water cooling system requires an additional cooling plate for passing the cooling is water into the stack which makes it difficult to decrease the whole size of the fuel cell system.

In a conventional fuel cell system, when unreacted air containing moisture flows from the stack and is exhausted into an atmosphere having a relatively lower temperature, the moisture condenses as it comes into contact with the atmosphere. An additional unit for storing or recycling the water generated through the condensation of the unreacted air must be provided, but that would make it more difficult to decrease the whole size of the fuel cell system. In addition, the thermal or electrical load for driving the additional member further deteriorates the efficiency and performance of the whole fuel cell system.

Furthermore, the conventional fuel cell system heats liquid-state fuel required for generation of electricity and generating hydrogen gas with the reformer. Since the thermal load is further increased by this heating of the fuel, the efficiency and performance of the whole fuel cell system is deteriorated.

SUMMARY OF THE INVENTION

The present invention solves the above-mentioned problems and it is an object of the present invention to provide a smaller fuel cell system with a proper temperature gradient on the whole area of a separator in order to enhance the performance and efficiently utilize heat generated from a stack and a reformer.

An aspect of the present invention provides a fuel cell system including a stack having an electricity generator, which includes a separator disposed on both surfaces of a membrane-electrode assembly, a reformer that converts fuel to generate hydrogen gas and supplies the hydrogen gas to the stack, a fuel supply unit that supplies the fuel to the reformer, and an air supply unit that supplies air to the stack. In addition, the system includes a cooling water supply unit that supplies cooling water to the stack, and a flow channel section that is formed in the separator and through which the cooling water supplied from the cooling water supply unit passes.

The fuel supply unit may comprise a fuel tank that is connected to the reformer and stores liquid-state fuel containing hydrogen, and a fuel pump that is connected to the fuel tank. The air supply unit may comprise an air pump connected to the stack. The cooling water supply unit may comprise a cooling water tank that is connected to the flow channel section and stores the cooling water and a cooling water pump that is connected to the cooling water tank.

A first channel that allows the air to flow into the membrane-electrode assembly may be formed on one surface of the separator, and a second channel that allows the hydrogen gas to flow into the membrane-electrode assembly may be formed on the other surface of the separator.

The separator may include a first inlet that supplies the air to the first channel, a first outlet that discharges unreacted air during passing through the first channel, a second inlet that supplies the hydrogen gas to the second channel, and a second outlet that discharges unreacted air during passing through the second channel.

The flow channel section may comprise a first flow channel formed on the separator corresponding to the area where the hydrogen gas and the air are supplied to the first channel and the second channel and a second flow channel formed on the separator corresponding to the area where the hydrogen gas and the air flow into the first channel and the second channel.

The first flow channel may have a first via hole into which the cooling water flows, a second via hole from which the cooling water flows out, and a first groove that connects the first via hole and the second via hole to each other.

The second flow channel may have a third via hole into which the cooling water flows, a fourth via hole from which the cooling water flows out, and a second groove that connects the third via hole and the fourth via hole to each other.

The flow channel section may further comprise a third flow channel formed on the separator corresponding to the area where the hydrogen gas and the air flow out from the first channel and the second channel.

The third flow channel may have a fifth via hole into which the cooling water passing through the first and second flow channels flows, a sixth via hole from which the cooling water flows out, and a third groove that connects the fifth via hole and the sixth via hole to each other.

Another aspect of the present invention provides a fuel cell system including a stack comprising an electricity generator, which includes a separator disposed on both surfaces of a membrane-electrode assembly, a reformer that converts fuel to generate hydrogen gas and supplies the hydrogen gas to the stack, a fuel supply unit that supplies the fuel to the reformer, and an air supply unit that supplies air to the stack. It also includes a cooling water supply unit that supplies cooling water to the stack, a flow channel section that is formed in the separator and through which the cooling water supplied from the cooling water supply unit passes, and a first heat exchanger. The first heat exchanger is disposed between and connected to the air supply unit and the stack and is also connected to the cooling water supply unit and the flow channel section.

The first heat exchanger may comprise a first supply tube that is connected to the air supply unit and the separator and which supplies the air to the separator, and at least one second supply tube that is connected to the cooling water supply unit and the first and second flow channels and which comes in contact with the first supply tube.

Another aspect of the present invention, provides a fuel cell system including a stack having an electricity generator, which includes a separator disposed on both surfaces of a membrane-electrode assembly, a reformer that converts fuel to generate hydrogen gas and supplies the hydrogen gas to the stack, a fuel supply unit that supplies the fuel to the reformer, and an air supply unit that supplies air to the stack. In addition, it includes a cooling water supply unit that supplies cooling water to the stack and a flow channel section that is formed in the separator and through which the cooling water supplied from the cooling water supply unit passes. The system may also include a first heat exchanger that is disposed between and connected to the air supply unit and the stack, and that is connected to the cooling water supply unit and the flow channel section, and a second heat exchanger that is disposed between and connected to the reformer and the stack, and that is connected to the flow channel section.

The second heat exchanger may comprise a third supply tube that is connected to the reformer and the separator and which supplies the hydrogen gas to the separator, and at least one fourth supply tube that is connected to the first, second, and the third flow channels and which comes in contact with the third supply tube.

The fuel cell system may further comprise a third heat exchanger that is disposed between and connected to the fuel supply unit and the reformer, and that is also connected to the flow channel section. The third heat exchanger may comprise a fifth supply tube which is connected to the fuel supply unit and the reformer and which supplies the fuel to the reformer, and at least one sixth supply tube that is connected to the third flow channel and that comes in contact with the fifth supply tube.

The fuel cell system may employ a polymer electrolyte membrane fuel cell (PEMFC) scheme.

BRIEF DESCRIPTION OF THE DRAWINGS

The above and other features and advantages of the present invention will become more apparent by describing in detail exemplary embodiments thereof with reference to the attached drawings.

DETAILED DESCRIPTION OF THE EMBODIMENTS

Hereinafter, embodiments of the present invention will be described in detail with reference to the accompanying drawings such that the embodiments can easily be put into practice by those skilled in the art. However, since the present invention can be embodied in various forms, the present invention is not limited to the embodiments described below.

Figure 1:
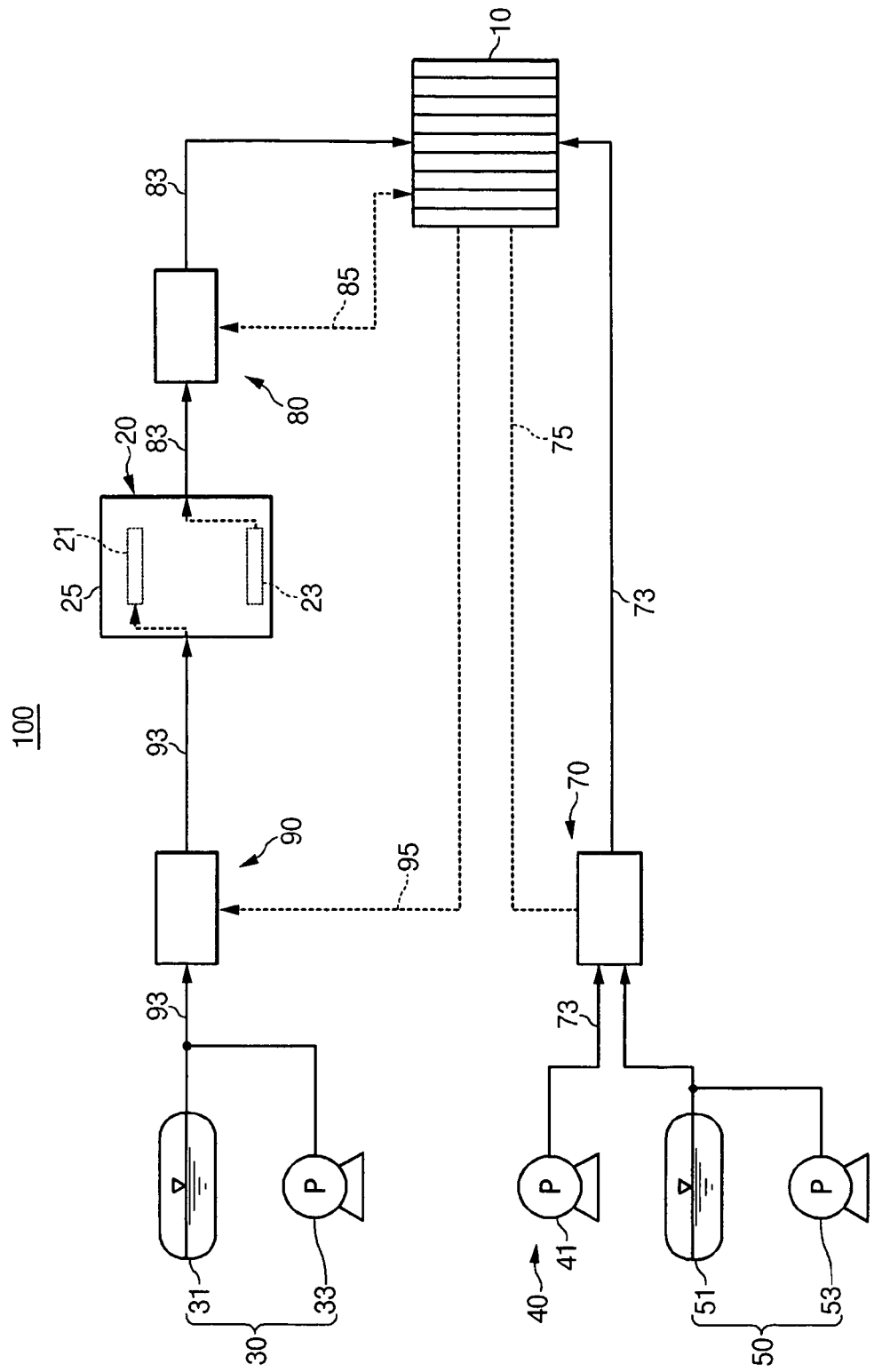
FIG. 1 is a schematic diagram illustrating the entire structure of a fuel cell system according to an embodiment of the present invention.
Figure 2:
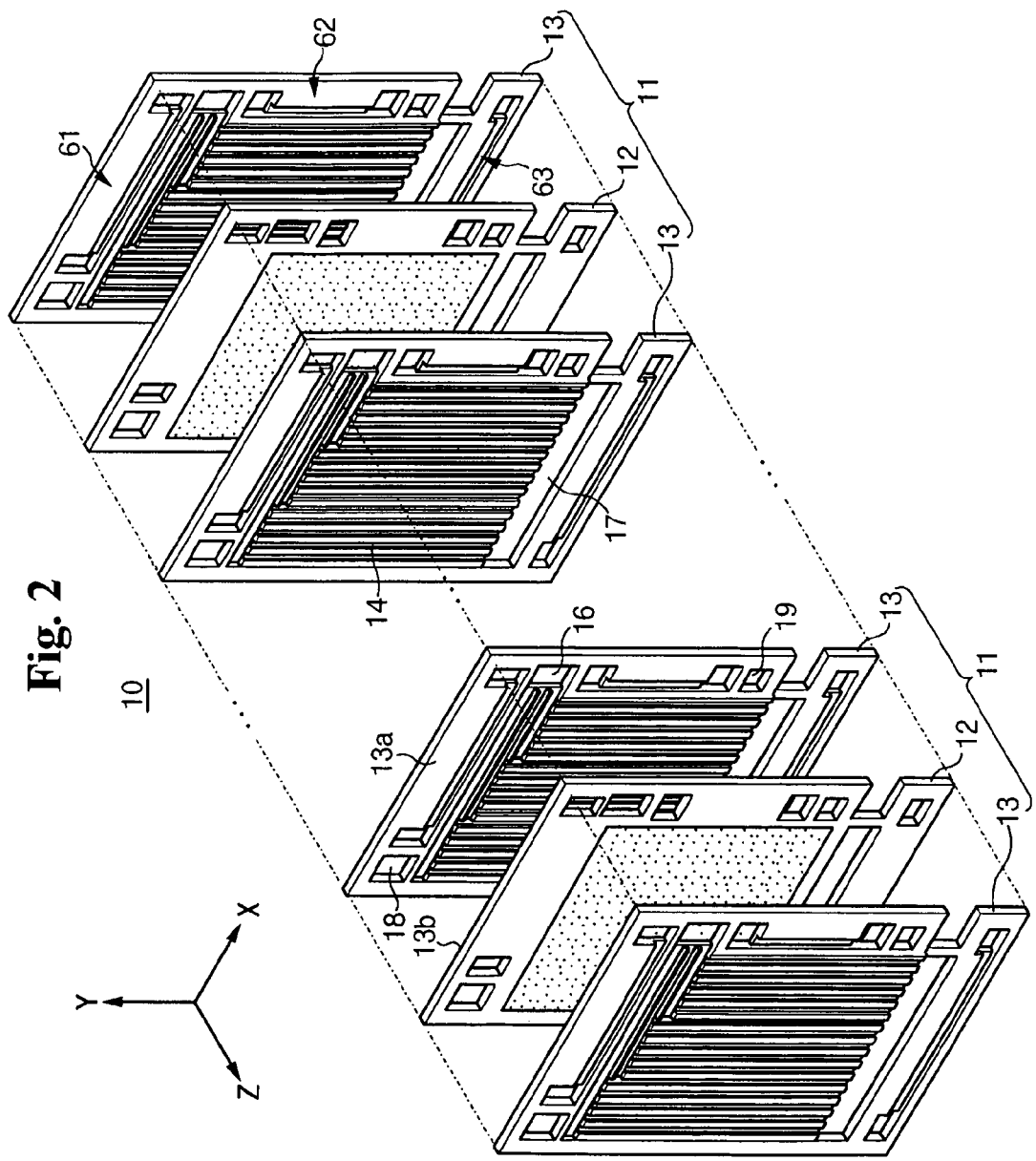
FIG. 2 is an exploded perspective view illustrating a structure of a stack shown in FIG. 1.
Figure 3:
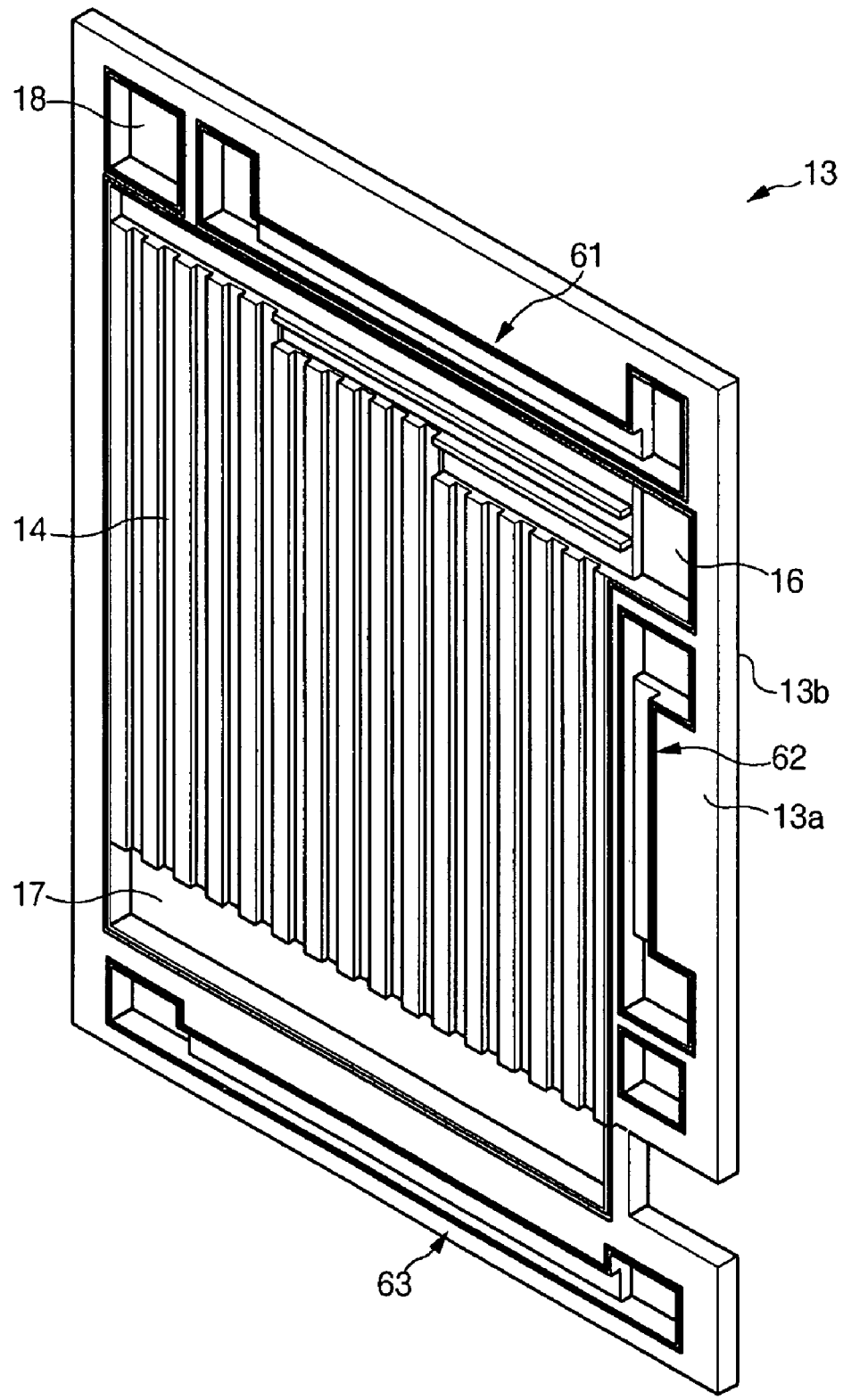
FIG. 3 is a perspective view illustrating a structure of a separator shown in FIG. 2.
Figure 4:
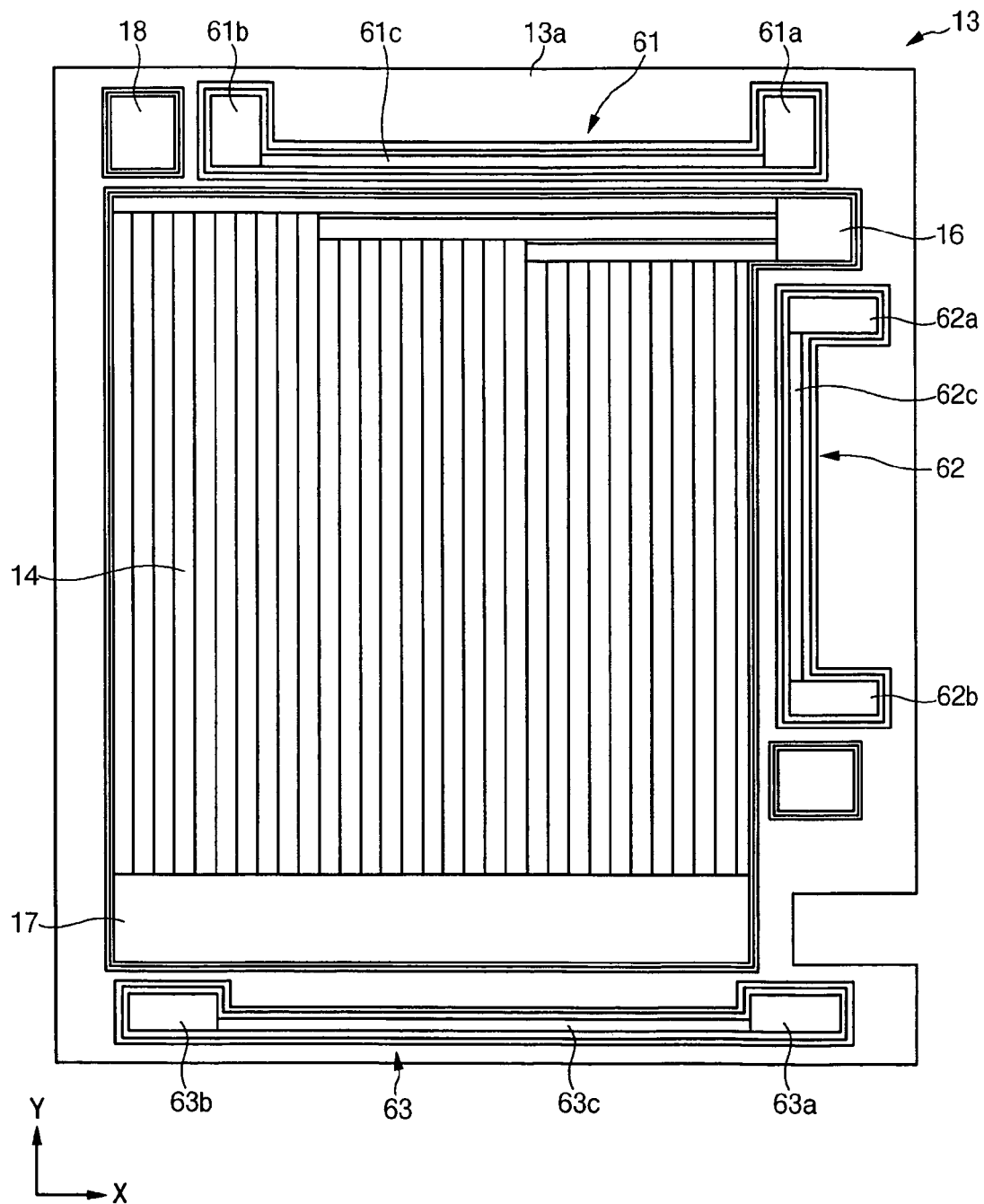
FIG. 4 is a front view illustrating the separator shown in FIG. 3.
Figure 5:
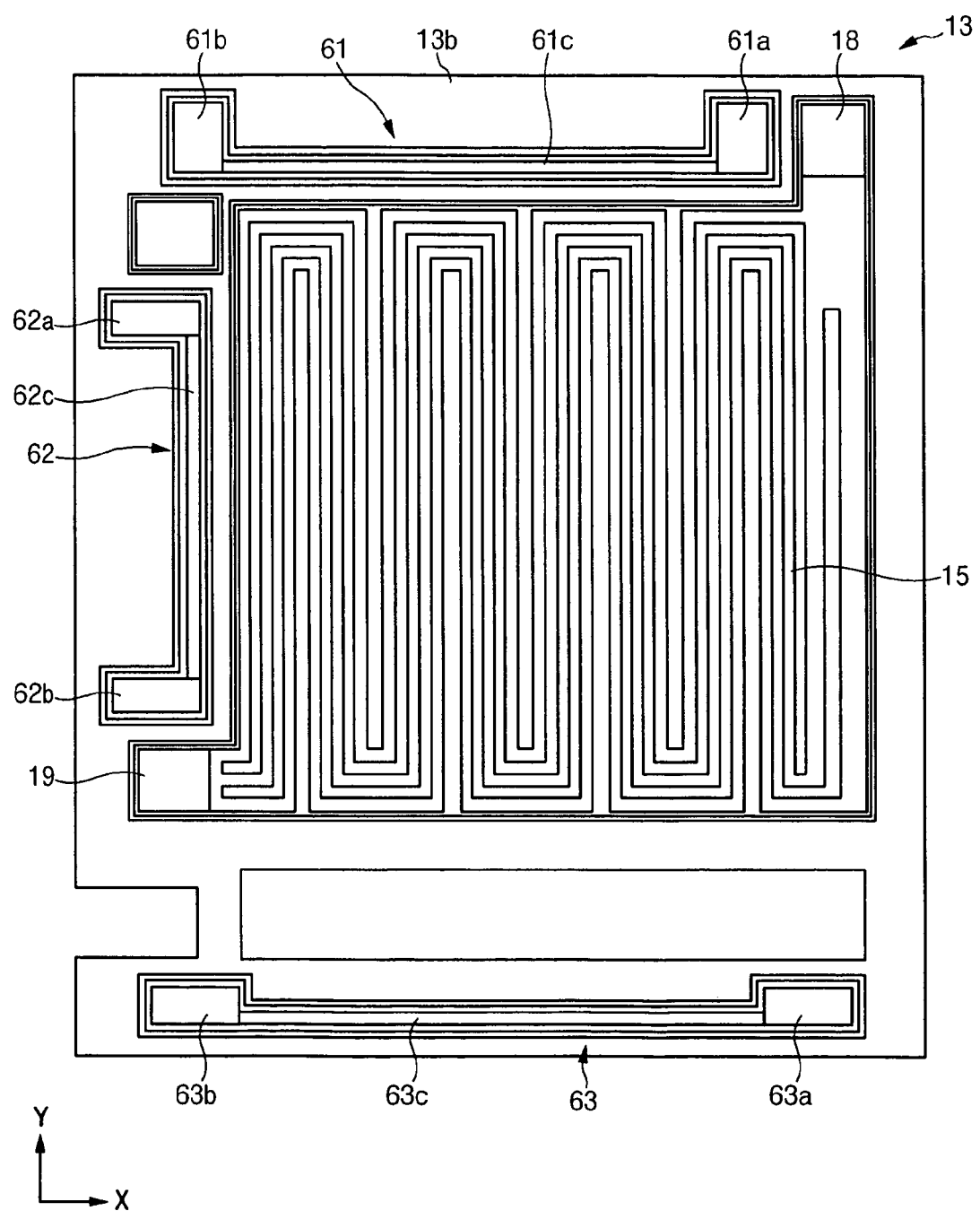
FIG. 5 is a backside view illustrating the separator shown in FIG. 3.

FIG. 1 is a schematic diagram illustrating the entire structure of a fuel cell system according to an embodiment of the present invention.

Referring to FIG. 1, a fuel cell system 100 according to the present invention employs a polymer electrolyte membrane fuel cell (PEMFC) in which hydrocarbon fuel such as methanol, ethanol, natural gas, etc. is converted to generate gas abundant in hydrogen. The reaction between the hydrogen and external air results in a flow of electricity.

The fuel cell system 100 according to the present invention basically comprises a stack 10 that converts chemical energy generated through chemical reaction between the hydrogen gas and the air into electrical energy to generate electricity. It also includes a reformer 20 that converts the fuel containing hydrogen to generate the hydrogen gas and that supplies the hydrogen gas to the stack 10, a fuel supply unit 30 that supplies the fuel to the reformer 20, and an air supply unit 40 that supplies external air to the stack 10.

The present invention may be embodied as a direct methanol fuel cell (DMFC) system in which liquid-state fuel can be directly supplied to the stack 10 to generate electricity. In this direct methanol fuel cell system, no reformer 20 is required, unlike in the PEMFC system.

Hereinafter, the present invention will be described with reference to the PEMFC system.

The fuel supply unit 30 comprises a fuel tank 31 for storing liquid-state fuel and a fuel pump 33 connected to the fuel tank 31 so as to discharge the fuel stored in the fuel tank 31. In the fuel cell system 100 according to the present invention, the fuel may include hydrocarbon-containing compounds such as methanol, ethanol, natural gas, etc. and may also include some added water.

The air supply unit 40 comprises an air pump 41 that suctions the external air with a predetermined force.

The above-mentioned reformer 20 has a structure of a conventional reformer. It removes noxious material such as carbon monoxide from the hydrogen gas as well as converts the fuel supplied from the fuel supply unit 30 into hydrogen gas through a reforming reaction.

That is, the reformer 20 has a reformation section reforming the fuel and a carbon-monoxide removing section removing carbon monoxide. The reformation section converts the fuel into reformed gas abundant in hydrogen through a catalytic reaction such as steam reformation, partial oxidation or natural reaction, etc. The carbon-monoxide removing section removes carbon monoxide from the reformed gas using a catalytic reaction such as water gas conversion, selective oxidation, or refinement of hydrogen with a separating membrane, etc.

The reformer 20 comprises a main body 25 having an inlet 21 and an outlet 23. The main body 25 is provided with the reformation section and the carbon-monoxide removing section. As a result, the fuel supplied from the fuel supply unit 30 flows into the main body 25 through the inlet 21, and the hydrogen gas reformed through the reformation section and the carbon-monoxide removing section is discharged through the outlet 23.

Referring to FIGS. 1 to 5, the stack 10 according to the present invention comprises at least one electricity generator 11 that is supplied with the hydrogen gas converted by the reformer 20 and the external air sucked by the air supply unit 40. This stack generates electric energy through an electrochemical reaction therebetween.

The electricity generator 11 is a unit cell generating electricity and comprises a membrane-electrode assembly (MEA) which oxidizes and reduces the hydrogen gas and the external air and separators 13 that supply the hydrogen gas and the air to the membrane-electrode assembly 12. In the electricity generator 11, the separators 13 are disposed at both sides of the membrane-electrode assembly 12. In the stack 10, a plurality of electricity generators 11 are continuously disposed, thereby forming one fuel cell.

The membrane-electrode assembly 12 has the configuration of a conventional membrane-electrode assembly in which an electrolyte membrane is interposed between an anode and a cathode constituting both surfaces thereof. The anode is supplied with the hydrogen gas through the separator 13, and comprises a catalytic layer which converts the hydrogen gas into electrons and hydrogen ions through oxidation. The anode also has a gas diffusion layer (GDL) which allows smooth movement of the electrons and the hydrogen ions. The cathode is supplied with the air through the separator 13, and comprises a catalytic layer that converts oxygen into electrons and oxygen ions through reduction and a GDL. The electrolyte membrane is a solid-state polymer electrolyte with a thickness of 50 to 200 μm, and has an ion exchange function of moving the hydrogen ions generated from the catalytic layer of the anode to the catalytic layer of the cathode.

A first surface of the separator 13 comes in close contact with the cathode of the membrane-electrode assembly 12, and the other surface, a second surface comes in close contact with the anode of the membrane-electrode assembly 12. Thus, the separator 13 functions as an electrical conductor connecting the anode and the cathode in series. The separator 13 also functions as a passageway that supplies the hydrogen gas and the air required for oxidation and reduction of the membrane-electrode assembly 12 to the anode and the cathode, respectively.

According to the present embodiment, a first channel 14 that supplies the air to the cathode of the membrane-electrode assembly 12 is formed on the first surface 13a (see FIG. 4) of the separator 13, and a second channel 15 that supplies the hydrogen gas to the anode of the membrane-electrode assembly 12 is formed on the second surface 13b (see FIG. 5) of the separator 13.

End plates (not shown) that come in close contact with either the anode or the cathode of the membrane-electrode assembly 12 may be disposed at the outermost sides of the stack 10, respectively. On the contact surface that comes in close contact with the membrane-electrode assembly 12, a channel supplying the air to the cathode and a channel supplying the hydrogen gas to the anode can be formed.

A first inlet 16 supplying the air to the first channel 14, a first outlet 17 that discharges unreacted air through the first channel 14, a second inlet 18 that supplies the hydrogen gas generated by the reformer 20 to the second channel 15, and a second outlet 19 that discharges the unreacted hydrogen gas through the second channel 15 are formed in the separator 13. The first and second inlets 16 and 18 and the first and second outlets 17 and 19 are embedded in the separator 13.

The first inlet 16 is embedded at one side of the separator 13 to communicate with a start end of the first channel 14. The second inlet 18 is embedded at another side of the separator 13 to communicate with a start end of the second channel 15. The first outlet 17 is embedded at another side of the separator 13 to communicate with a finish end of the first channel 14. The second outlet 19 is embedded at another side of the separator 13 to communicate with a finish end of the second channel 15.

In other words, the first inlet 16 on the first surface 13a of the separator 13, communicates with the first channel 14 but the second inlet 18 does not communicate with the first channel 14. In contrast, the second inlet 18 on the second surface 13b of the separator 13, communicates with the second channel 15 but the first inlet 16 does not communicate with the second channel 15.

In addition, on the first surface 13a of the separator 13, the first outlet 17 communicates with the first channel 14 but the second outlet 19 does not communicate with the first channel 14. In contrast, on the second surface 13b of the separator 13, the second outlet 19 communicates with the second channel 15 but the first outlet 17 does not communicate with the second channel 15.

The electricity generator 11 having the above-mentioned structure generates electricity and water through the following chemical reactions.

Anode reaction: $H_2 \rightarrow 2H^+ + 2e^-$
Cathode reaction: $\frac{1}{2}O_2 + 2H^+ + 2e^- \rightarrow H_2O$
Total reaction: $H_2 + \frac{1}{2}O_2 \rightarrow H_2O + \text{current} + \text{heat}$ Referring to the chemical reactions, the hydrogen gas is supplied to the anode of the membrane-electrode assembly 12 through the separator 13, and the air is supplied to the cathode through the separator 13. When the hydrogen gas flows into the anode, hydrogen is decomposed into electrons and protons (hydrogen ions) in the catalytic layer. As the protons pass through the electrolyte membrane, electrons, oxygen ions, and the protons combine to generate water with the help of catalyst. The electrons generated from the anode do not pass through the electrolyte membrane but are moved to the cathode through an external circuit.

While operating the fuel cell system 100 according to the present invention, the electricity generator 11 of the stack 10 also generates heat as a byproduct. The heat dries the membrane-electrode assembly 12, thereby causing deterioration in performance of the stack 10. The stack 10 discharges the unreacted air containing a significant amount of moisture from the electricity generator 11.

The fuel cell system according to the present invention can prevent the membrane-electrode assembly 12 from being dried by the heat and can also condense the moisture in the unreacted air, by circulating cooling water supplied from the cooling water supply unit 50 to the separator 13 to provide a proper temperature gradient to the entire area of the separator 13.

To accomplish this, at least one flow channel that allows the cooling water supplied from the cooling water supply unit 50 to pass is formed in the separator 13. The cooling water supply unit 50 may comprise a cooling water tank 51 for storing, water or other coolants, for example, and a cooling water pump 53 connected to the cooling water tank 51 to discharge the water stored in the cooling water tank 51 with a predetermined pumping power.

The flow channel section according to the present embodiment includes a first flow channel 61 formed at the respective outsides of the first and second channels 14 and 15 corresponding to the area where the hydrogen gas and the air flow into the first and second channels 14 and 15. It also includes a second flow channel 62 formed at the outsides of the first and second channels 14 and 15 corresponding to the area where the hydrogen gas and the air flow along the first and second channel 14 and 15. Further, a third flow channel 63 is formed at the outsides of the first and second channels 14 and 15 corresponding to the area where the hydrogen gas and the air flow out with respect to the first and second channels 14 and 15.

Here, the first flow channel 61 is formed at the edge of the first and second inlets 16 and 18 side corresponding to the x-direction in the figure. The second flow channel 62 is formed at the outer edge of the first and second channels 14 and 15 corresponding to the y-direction in the figure with respect to the first and second inlets 16 and 18. The third flow channel 63 is formed at the edge of the first and second outlets 17 and 19 corresponding to the x-direction in the figure. Here, the "edge" refers to the portions of the separator 13 where the first and second channels 14 and 15, the first and second inlets 16 and 18, and the first and second outlets 17 and 19 are not formed.

The first flow channel 61 has a first via hole 61a into which the cooling water supplied from the cooling supply unit 50 can flow, a second via hole 61b from which the cooling water can substantially flow, and a first groove 61c that connects the first via hole 61a and the second via hole 61b to each other. Here, the first groove 61c connects the first via hole 61a and the second via hole 61b to each other with respect to the first surface 13a of the separator 13, and connects the first via hole 61a and the second via hole 61b to each other with respect to the second surface 13b.

The second flow channel 62 has a third via hole 62a into which the cooling water supplied from the cooling supply unit 50 can flow, a fourth via hole 62b from which the cooling water can substantially flow, and a second groove 62c that connects the third via hole 62a and the fourth via hole 62b to each other. Here, the second groove 62c connects the third via hole 62a and the fourth via hole 62b to each other with respect to the first surface 13a of the separator 13, and connects the third via hole 62a and the fourth via hole 62b to each other with respect to the second surface 13b.

The third flow channel 63 has a fifth via hole 63a into which the cooling water passing through the first and second flow channels 61 and 62 can flow, a sixth via hole 63b from which the cooling water can substantially flow, and a third groove 63c that connects the fifth via hole 63a and the sixth via hole 63b to each other. Here, the third groove 63c connects the fifth via hole 63a and the sixth via hole 63b to each other with respect to the first surface 13a of the separator 13, and connects the fifth via hole 63a and the sixth via hole 63b to each other with respect to the second surface 13b.

The fuel cell system 100 of the present invention may also comprises a first heat exchanger 70 which can further cool the cooling water supplied from the cooling water supply unit 50 through contact with the air supplied from the air supply unit 40. The first heat exchanger can also supply the cooling water to the first and second flow channel 61 and 62, and can substantially cool the heat acting on the separator 13.

Figure 6:
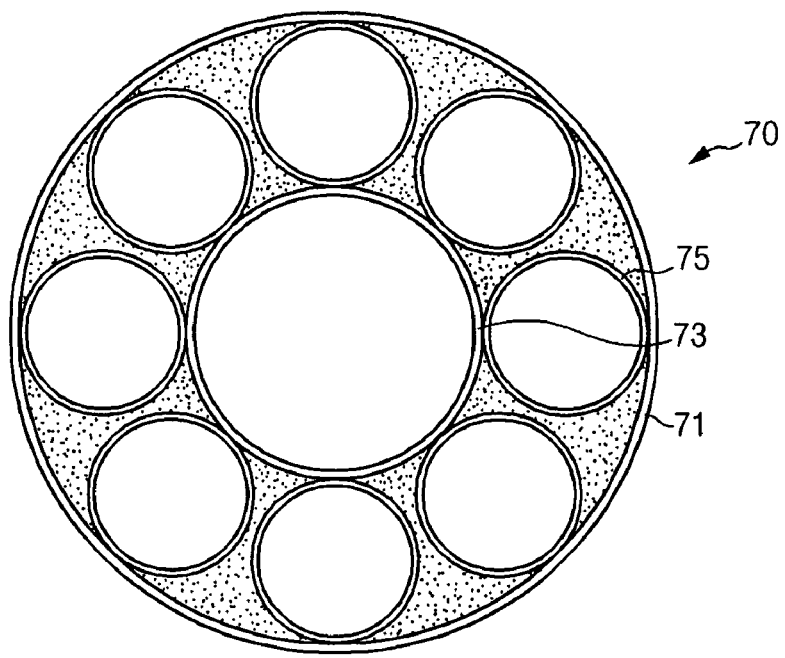
FIG. 6 is a cross-sectional view schematically illustrating a first heat exchanger shown in FIG. 1.

FIG. 6 is a cross-sectional view schematically illustrating a structure of the first heat exchanger 70 shown in FIG. 1.

Referring to FIGS. 1 to 6, the first heat exchanger 70 according to the present embodiment comprises a first supply tube 73 connected to the air supply unit 40 and the separator 13, and at least one second supply tube 75 connected to the cooling water supply unit 50 and the first and second flow channels 61 and 62, respectively.

The first supply tube 73 supplies the first channel 14 with the air required for generating electricity in the electricity generator 11. The first supply tube 73 has a pipe shape connected to the air pump 41 of the air supply unit 40 and the first inlet 16 of the separator 13, respectively. The first supply tube 73 is disposed at the inside of a first pipe 71 having an inner diameter greater than the outer diameter of the first supply tube 73.

The second supply tube 75 supplies the first and second flow channel 61 and 62 with the cooling water supplied from the cooling water supply unit 50. The second supply tube 75 has a pipe shape and is connected to the cooling water tank 51 of the cooling water supply unit 50 and the first and second flow channels 61 and 62, respectively. The second supply tube 75 is connected to the first via hole 61a of the first flow channel 61 and the third via hole 62a of the second flow channel 62, respectively. In the present embodiment, the second supply tube 75 is disposed at the inside of the first pipe 71.

That is, a plurality of second supply tubes 75 are disposed between the outer circumferential surface of the first supply tube 73 and the inner circumferential surface of the first pipe 71, and come in contact with the outer circumferential surface of the first supply tube 73.

When the cooling water is further cooled through heat exchange between the cooling water supplied through the second supply tube 75 from the cooling water supply unit 50 and the air supplied through the first supply tube, the cooling water is supplied to the first and second flow channel 61 and 62. As a result, the cooling water with a relatively low temperature moderates the temperature increase at the area where the hydrogen gas and the air flow into the separator 13 and maintains the temperature constant at the areas advanced from an approximately intermediate portion of the separator 13, while passing through the first and second flow channels 61 and 62.

The fuel cell system 100 according to the present invention may also comprise a second heat exchanger 80 which transfers heat between the cooling water heated by the first heat exchanger 70 while passing through the first and second flow channels 61 and 62 and the hydrogen gas that is discharged from the reformer 20 at a relatively high temperature, which supplies the cooling water further heated to the third flow channel 63 to heat the first outlet 17 side of the separator 13, thereby vaporizing the moisture in the unreacted air discharged from the first outlet 17.

Figure 7:
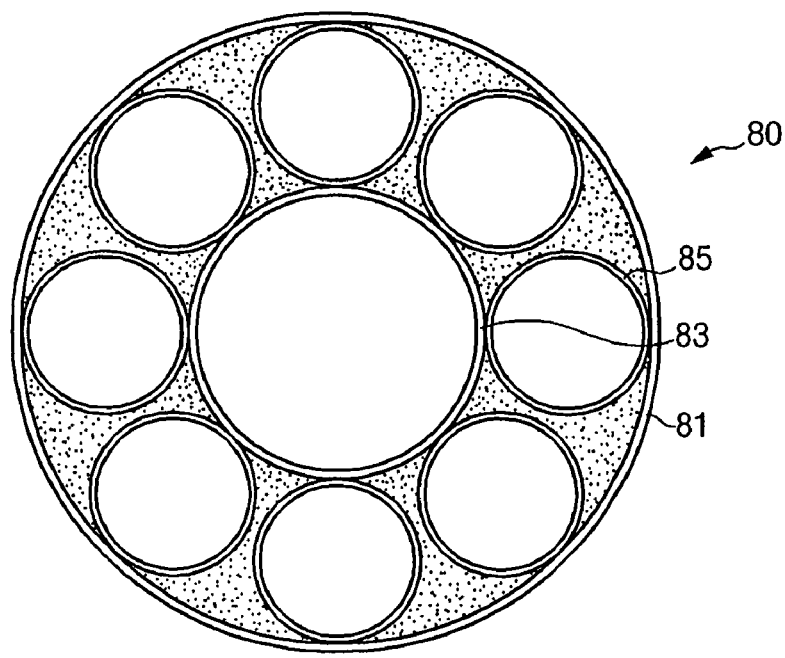
FIG. 7 is a cross-sectional view schematically illustrating a second heat exchanger shown in FIG. 1.

FIG. 7 is a cross-sectional view schematically illustrating a structure of the second heat exchanger 80 shown in FIG. 1.

Referring to FIGS. 1 to 7, the second heat exchanger 80 according to the present embodiment comprises a third supply tube 83 connected to the reformer 20 and the stack 10, and at least one fourth supply tube 85 connected to the first, second, and third flow channels 61, 62, and 63 of the separator 13, respectively.

The third supply tube 83 supplies the second channel 15 with the hydrogen gas generated from the reformer 20. The third supply tube 83 has a pipe shape and is connected to the outlet 23 of the reformer 20 and the second inlet 18 of the separator 13. The third supply tube 83 is disposed at the inside of a second pipe 81 having an inner diameter greater than the outer diameter of the third supply tube 83.

The fourth supply tube 85 withdraws the cooling water heated to a predetermined temperature during passing through the first and second flow channels 61 and 62, further heats the cooling water by the heat exchange with the hydrogen gas generated from the reformer 20, and then supplies the third flow channel 63 with the heated cooling water. The fourth supply tube 85 has a pipe shape where one end is closed and the other end is open, and the open end is connected to the first, second, and third flow channels 61, 62, and 63, respectively. The fourth supply tube 85 is connected to the second via hole 61b of the first flow channel 61, the fourth via hole 62b of the second flow channel 62, and the fifth via hole 63a of the third flow channel 63, respectively. The fourth supply tube 85 is disposed at the inside of the second pipe 81. That is, a plurality of fourth supply tubes 85 are disposed between the outer circumferential surface of the third supply tube 83 and the inner circumferential surface of the second pipe 81, and come in contact with the outer circumferential surface of the third supply tube 83.

Accordingly, the cooling water heated while passing through the first and second flow channels 61 and 62 by the first heat exchanger 70 flows out through the fourth supply tube 85, is further heated by heat exchange with hydrogen gas with a relatively high temperature supplied through the third supply tube 83 from the reformer 20, and is then supplied to the third flow channel 63, thereby vaporizing the moisture in the unreacted air discharged through the first outlet 17 of the separator 13. That is, the heated cooling water cools the separator 13 through which the unreacted air is discharged at a predetermined temperature, thereby vaporizing the moisture in the unreacted air discharged through the first outlet 17 of the separator 13.

The fuel cell system 100 according to the present invention may also comprise a third heat exchanger 90 that preheats the fuel by heat exchange between the cooling water having a relatively high temperature, the cooling water having vaporized the moisture in the unreacted air discharged from the first outlet 17 of the separator 13 in the second heat exchanger 80, and the fuel supplied to the reformer 20 from the fuel supply unit 30.

Figure 8:
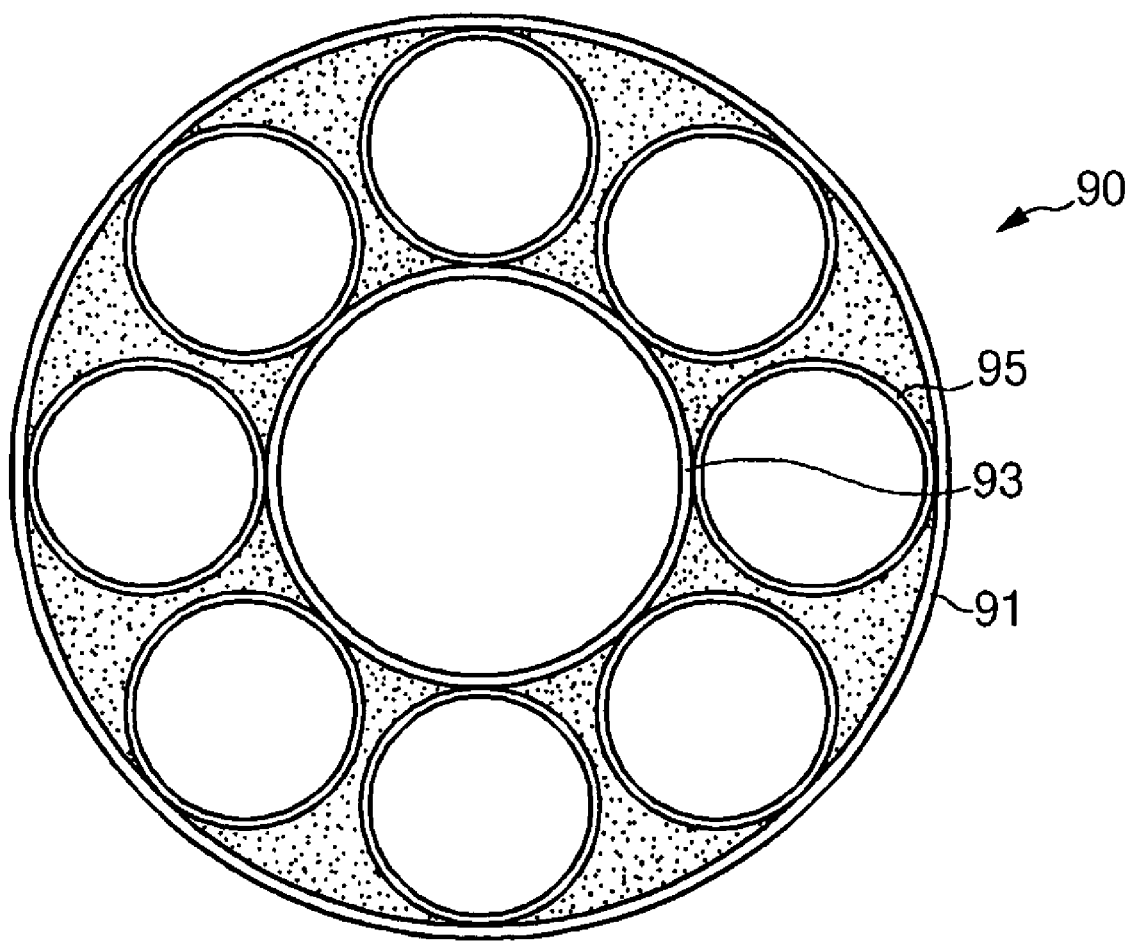
FIG. 8 is a cross-sectional view schematically illustrating a third exchanger shown in FIG. 1.

FIG. 8 is a cross-sectional view schematically illustrating a structure of the third heat exchanger 90 shown in FIG. 1.

Referring to FIGS. 1 to 8, the third heat exchanger 90 according to the present embodiment comprises a fifth supply tube 93 connected to the fuel supply unit 30 and the reformer 20, and at least one sixth supply tube 95 connected to the third flow channel 63 of the separator 13.

The fifth supply tube 93 supplies the reformer 20 with the fuel discharged from the fuel supply unit 30. The fifth supply tube 93 has a pipe shape and is connected to the fuel tank 31 of the fuel supply unit 30 and the inlet 21 of the reformer 20. The fifth supply tube 93 is disposed at the inside of a third pipe 91 having an inner diameter greater than the outer diameter of the fifth supply tube 93.

The sixth supply tube 95 supplies the fifth supply tube 93 with the cooling water having a relatively high temperature and having vaporized the moisture in the unreacted air discharged from the first outlet 17 of the separator 13 during passing through the third flow channel 63 in the second heat exchanger 80. The sixth supply tube 95 has a pipe shape where is one end is closed and the other end is open, and the open end is connected to the sixth via hole 63b of the third flow channel 63. The sixth supply tube 95 is disposed at the inside of the third pipe 91. That is, a plurality of sixth supply tubes 95 are disposed between the outer circumferential surface of the fifth supply tube 93 and the inner circumferential surface of the third pipe 91, and come in contact with the outer circumferential surface of the fifth supply tube 93.

Accordingly, the cooling water having a relatively high temperature and having vaporized the moisture in the unreacted air discharged through the first outlet 17 of the separator 13 during passing through the third flow channel 63 in the second heat exchanger 80 flows out through the sixth supply tube 95, and preheats the fuel by the heat exchange with the fuel having a relatively low temperature supplied through the fifth supply tube 93 from the fuel supply unit 30.

Operation of the fuel cell system according to the present embodiment having the aforementioned structure will be described in detail.

First, in an initial driving mode of the fuel cell system 100, the fuel pump 33 of the fuel supply unit 30 is activated, and the liquid-state fuel stored in the fuel tank 31 is supplied to the reformer 20 through the fifth supply tube 93. Then, the reformer 20 converts the fuel and generates the hydrogen gas. Subsequently, the hydrogen gas is supplied to the second inlet 18 of the separator 13 through the third supply tube 83, and the air pump 41 of the air supply unit 40 is activated, thereby supplying the external air to the first inlet 16 of the separator 13 through the first supply tube 73.

Then, the air is supplied to the cathode of the membrane-electrode assembly 12 through the first channel 14 of the separator 13, and the hydrogen gas is supplied to the anode electrode of the membrane-electrode assembly 12 through the second channel 15 of the separator 13. Here, the fuel and the hydrogen gas can are pumped through the channel by the fuel pump 33.

When the hydrogen gas and the air are supplied to the electricity generator 11, it generates electricity and water through the reaction between the hydrogen gas and the air as well as a certain amount of heat. In order to reduce the damage to the system caused by the excess heat, the cooling water pump 53 is activated, and the cooling water is discharged through the second supply tube 75 from the cooling water tank 51. Simultaneously, the air supply unit 40 activates the air pump 41 and is supplies the external air to the first inlet 16 of the separator 13 through the first supply tube 73. Since the cooling water is subjected to heat exchange with the air supplied through the first supply tube 73, the cooling water can maintain a cooler temperature than the initial state.

Subsequently, the cooling water is supplied to the first and second flow channel 61 and 62 through the second supply tube 75, which alleviates the increase in temperature at the area where the hydrogen gas and the air flow into the separator 13 and maintains a constant temperature at the peripheral regions of the separator 13, while passing through the first and second flow channels 61 and 62. Here, the cooling water can flow through the flow channel sections by means of the pumping power of the cooling water pump 53.

Subsequently, the cooling water passing through the first and second flow channels 61 and 62 is discharged through the fourth supply tube 85. At this time, the reformer is reforming the fuel supplied from the fuel supply unit 30 to generate the hydrogen gas having a relatively high temperature, and is supplying the hydrogen gas to the second inlet 18 of the separator 13 through the third supply tube 83.

Therefore, since the cooling water discharged from the first and second flow channels 61 and 62 through the fourth supply tube 85 is subjected to the heat exchange with the hydrogen gas supplied through the third supply tube 83, the discharged cooling water remains further heated by the heat exchange with the hydrogen gas. The heated cooling water is supplied to the third flow channel 63 through the fourth supply tube 85. At this time, the stack 10 discharges the unreacted air containing moisture through the first outlet 17 of the separator 13. That is, the cooling water having a relatively high temperature due to the heat exchange with the hydrogen gas heats the area from which the unreacted air is discharged while passing through the third flow channel 63, so that the moisture in the unreacted air discharged from the first outlet 17 of the separator 13 can be vaporized and cannot be condensed, unlike the conventional case.

Subsequently, the cooling water passing through the third flow channel 63 is discharged through the sixth supply tube 95. At this time, the fuel supply unit 30 is supplying the liquid-state fuel to the reformer 20 through the fifth supply tube 93.

That is, the cooling water discharged from the third flow channel 63 through the sixth supply tube 95 preheats the fuel supplied through the fifth supply tube 93 by the heat exchange with the fuel. At this time, the cooling water can be supplied to the cooling tank 51 again through a particular passage.

In the fuel cell system according to the present invention, by providing a predetermined temperature gradient to the entire area of the separator, it is possible to prevent the membrane-electrode assembly from being damaged due to the heat generated at the time of generating the electricity. In addition, by vaporizing the moisture in the unreacted air that is discharged from the stack, the heat generated from the stack and the reformer can be utilized as an energy source required for driving the entire system. Therefore, it is possible to further enhance the performance and the thermal efficiency of the entire system.

Since the conventional cooling plate is omitted and the flow channel section through which the cooling water passes is provided in the separator itself, it is also possible to decrease the size of the entire system.

Although the exemplary embodiments of the present invention have been described, the present invention is not limited to the exemplary embodiments, but may be modified in various forms without departing from the scope of the appended claims, the detailed description, and the accompanying drawings of the present invention. Therefore, it is natural that such modifications belong to the scope of the present invention.

What is claimed is:

1. A fuel cell system, comprising:
   a stack that has an electricity generator, the electricity generator comprising a membrane electrode assembly, a separator disposed on a first surface of the membrane electrode assembly, and a separator disposed on a second surface of the membrane electrode assembly;
   a reformer to convert fuel to generate hydrogen gas;
   a fuel supply unit to supply the fuel to the reformer;
   an air supply unit to supply air to the stack; and
   a cooling water supply unit to supply cooling water to the stack,
   wherein each separator comprises a flow channel section through which the cooling water supplied from the cooling water supply unit passes, and
   wherein the flow channel section comprises:
     a first flow channel comprising a first via hole into which the cooling water flows, a second via hole from which the cooling water flows out, and a first groove that connects the first via hole and the second via hole to each other, the first flow channel being formed on the separator along a first edge thereof; and
     a second flow channel comprising a third via hole into which the cooling water flows, a fourth via hole from which the cooling water flows out, and a second groove that connects the third via hole and the fourth via hole to each other, the second flow channel being formed on the separator along a second edge thereof, the second edge being adjacent to the first edge.

2. The fuel cell system of claim 1, wherein the fuel supply unit comprises:
   a fuel tank connected to the reformer and stores liquid-state fuel containing hydrogen; and
   a fuel pump connected to the fuel tank.

3. The fuel cell system of claim 1, wherein the air supply unit comprises:
   an air pump connected to the stack.

4. The fuel cell system of claim 1, wherein the cooling water supply unit comprises:
   a cooling water tank connected to the flow channel section and storing the cooling water; and
   a cooling water pump connected to the cooling water tank.

5. The fuel cell system of claim 1, wherein
   a first channel to allow the air to flow into the membrane-electrode assembly is formed on a first surface of the separator, and
   a second channel to allow the hydrogen gas to flow into the membrane-electrode assembly is formed on a second surface of the separator.

6. The fuel cell system of claim 5, wherein the separator comprises:
a first inlet to supply the air to the first channel;
a first outlet to discharge unreacted air while passing through the first channel;
a second inlet to supply the hydrogen gas to the second channel; and
a second outlet to discharge unreacted hydrogen gas while passing through the second channel.

7. The fuel cell system of claim 5, wherein:
the first edge of the separator corresponds to an area where the hydrogen gas and the air are supplied to the first channel and the second channel; and
the second edge of the separator corresponds to an area where the hydrogen gas and the air flow along the first channel and the second channel.

8. The fuel cell system of claim 7, wherein the flow channel section further comprises:
a third flow channel formed on the separator along a third edge thereof, the third edge being opposite the first edge and corresponding to an area where the hydrogen gas and the air flow out from the first channel and the second channel.

9. The fuel cell system of claim 8, wherein the third flow channel comprises:
a fifth via hole into which the cooling water passing through the first and second flow channels flow;
a sixth via hole from which the cooling water flows out; and
a third groove connecting the fifth via hole and the sixth via hole to each other.

10. The fuel cell system of claim 1, wherein the stack comprises:
a polymer electrolyte membrane.

11. A fuel cell system, comprising:
a stack that has an electricity generator, the electricity generator comprising a membrane electrode assembly, a separator disposed on a first surface of the membrane electrode assembly, and a separator disposed on a second surface of the membrane electrode assembly;
a reformer to convert fuel to generate hydrogen gas;
a fuel supply unit to supply the fuel to the reformer;
an air supply unit to supply air to the stack;
a cooling water supply unit to supply cooling water to the stack; and
a first heat exchanger that is connected to the air supply unit and the stack and is also connected to the cooling water supply unit and the flow channel section,
wherein each separator comprises a flow channel section through which the cooling water supplied from the cooling water supply unit passes, and
wherein the flow channel section comprises:
a first flow channel comprising a first via hole into which the cooling water flows, a second via hole from which the cooling water flows out, and a first groove that connects the first via hole and the second via hole to each other, the first flow channel being formed on the separator along a first edge thereof; and
a second flow channel comprising a third via hole into which the cooling water flows, a fourth via hole from which the cooling water flows out, and a second groove that connects the third via hole and the fourth via hole to each other, the second flow channel being formed on the separator along a second edge thereof, the second edge being adjacent to the first edge.

12. The fuel cell system of claim 11,
wherein a first channel allowing the air to flow into the membrane-electrode assembly is formed on a first surface of the separator, and
wherein a second channel allowing the hydrogen gas to flow into the membrane-electrode assembly is formed on a second other surface of the separator.

13. The fuel cell system of claim 12,
wherein the first edge of the separator corresponds to an area where the hydrogen gas and the air are supplied to the first channel and the second channel, and
wherein the second edge of the separator corresponds to an area where the hydrogen gas and the air flow along the first channel and the second channel.

14. The fuel cell system of claim 13, wherein the first heat exchanger comprises:
a first supply tube connected to the air supply unit and the separator, the first supply tube to supply the air to the separator; and
at least one second supply tube connected to the cooling water supply unit and the first and second flow channels, the at least one second supply tube contacting the first supply tube.

15. The fuel cell system of claim 11, wherein the stack comprises:
a polymer electrolyte membrane.

16. A fuel cell system, comprising:
a stack that has an electricity generator, the electricity generator comprising a membrane electrode assembly, a separator disposed on a first surface of the membrane electrode assembly, and a separator disposed on a second surface of the membrane electrode assembly;
a reformer to convert fuel to generate hydrogen gas;
a fuel supply unit to supply the fuel to the reformer;
an air supply unit to supply air to the stack;
a cooling water supply unit to supply cooling water to the stack;
a first heat exchanger connected to the air supply unit and the stack and connected to the cooling water supply unit and the flow channel section; and
a second heat exchanger connected to the reformer and the stack and connected to the flow channel section,
wherein each separator comprises a flow channel section through which the cooling water supplied from the cooling water supply unit passes, and
wherein the flow channel section comprises:
a first flow channel comprising a first via hole into which the cooling water flows, a second via hole from which the cooling water flows out, and a first groove that connects the first via hole and the second via hole to each other, the first flow channel being formed on the separator along a first edge thereof; and
a second flow channel comprising a third via hole into which the cooling water flows, a fourth via hole from which the cooling water flows out, and a second groove that connects the third via hole and the fourth via hole to each other, the second flow channel being formed on the separator along a second edge thereof, the second edge being adjacent to the first edge.

17. The fuel cell system of claim 16,
wherein a first channel allowing the air to flow into the membrane-electrode assembly is formed on a first surface of the separator, and
wherein a second channel allowing the hydrogen gas to flow into the membrane-electrode assembly is formed on a second surface of the separator.

18. The fuel cell system of claim 17,
wherein the first edge of the separator corresponds to an area where the hydrogen gas and the air are supplied to the first channel and the second channel,
wherein the second edge of the separator corresponds to an area where the hydrogen gas and the air flow along the first channel and the second channel, and
wherein a third flow channel is formed on the separator along a third edge thereof, the third edge being opposite the first edge and corresponding to an area where the hydrogen gas and the air flow out from the first channel and the second channel.

19. The fuel cell system of claim 18,
wherein the second heat exchanger comprises:
a third supply tube connected to the reformer and the separator, the third supply tube to supply the hydrogen gas to the separator,
wherein at least one fourth supply tube is connected to the first, second, and the third flow channels and contacts the third supply tube.

20. The fuel cell system of claim 18, further comprising:
a third heat exchanger connected to the fuel supply unit and the reformer, and connected to the flow channel section.

21. The fuel cell system of claim 20, wherein the third heat exchanger comprises:
a fifth supply tube connected to the fuel supply unit and the reformer, the fifth supply tube to supply the fuel to the reformer; and
at least one sixth supply tube connected to the third flow channel and contacting the fifth supply tube.

22. The fuel cell system of claim 16, wherein the stack comprises:
a polymer electrolyte membrane.

23. A stack, comprising:
an electricity generator that includes a membrane-electrode assembly, a separator disposed on a first surface of the membrane-electrode assembly, and a separator disposed on a second surface of the membrane-electrode assembly,
wherein each separator comprises:
a first channel to supply air to the membrane-electrode assembly formed on one surface of the separator,
a second channel to supply hydrogen gas to the membrane-electrode assembly formed on the other surface of the separator, and
a flow channel section through which cooling water passes formed in the separator,
wherein the flow channel section comprises:
a first flow channel comprising a first via hole into which the cooling water flows, a second via hole from which the cooling water flows out, and a first groove that connects the first via hole and the second via hole to each other, the first flow channel being formed on the separator along a first edge thereof; and
a second flow channel comprising a third via hole into which the cooling water flows, a fourth via hole from which the cooling water flows out, and a second groove that connects the third via hole and the fourth via hole to each other, the second flow channel being formed on the separator along a second edge thereof, the second edge being adjacent to the first edge.

24. The stack of claim 23, wherein:
the first edge of the separator corresponds to an area where the hydrogen gas and the air are supplied to the first channel and the second channel; and
the second edge of the separator corresponds to an area where the hydrogen gas and the air flow along the first channel and the second channel.

25. The stack of claim 24, wherein the flow channel section further comprises:
a third flow channel formed on the separator along a third edge thereof, the third edge being opposite the first edge and corresponding to an area where the hydrogen gas and the air are discharged from the first and second channels.

* * * * *